United States Patent
Zhou et al.

(10) Patent No.: US 8,821,759 B2
(45) Date of Patent: Sep. 2, 2014

(54) RARE EARTH ION DOPED LANTHANUM GALLATE LUMINOUS MATERIAL CONTAINING METAL PARTICLES AND PREPARATION METHOD THEREOF

(75) Inventors: Mingjie Zhou, Shenzhen (CN); Wenbo Ma, Shenzhen (CN); Ting Lv, Shenzhen (CN)

(73) Assignee: Ocean's King Lighting Science & Technology Co., Ltd., Shenzhen, Guangdong (CN)

( * ) Notice: Subject to any disclaimer, the term of this patent is extended or adjusted under 35 U.S.C. 154(b) by 114 days.

(21) Appl. No.: 13/634,617

(22) PCT Filed: Apr. 23, 2010

(86) PCT No.: PCT/CN2010/072171
§ 371 (c)(1),
(2), (4) Date: Sep. 13, 2012

(87) PCT Pub. No.: WO2011/130926
PCT Pub. Date: Oct. 27, 2011

(65) Prior Publication Data
US 2013/0015402 A1      Jan. 17, 2013

(51) Int. Cl.
C09K 11/87    (2006.01)
C09K 11/80    (2006.01)
C09K 11/77    (2006.01)

(52) U.S. Cl.
CPC .......... *C09K 11/7769* (2013.01); *C09K 11/873* (2013.01); *C09K 11/7787* (2013.01)
USPC .................................................. 252/301.4 R

(58) Field of Classification Search
USPC .................................................. 252/301.4 R
See application file for complete search history.

(56) References Cited

FOREIGN PATENT DOCUMENTS

| CN | 101050360 A | 10/2007 |
|---|---|---|
| CN | 101692495 A | 4/2010 |
| CN | 101760198 A | 6/2010 |
| EP | 0276519 A1 | 8/1988 |
| EP | 1026133 A2 | 8/2000 |
| JP | 6256091 A | 9/1994 |
| KR | 20020003886 A | 1/2002 |

OTHER PUBLICATIONS

Senyshyn A et al: "Powder diffraction studies of pressure-induced instabilities in orthorhombic LnGaO3", Zeitschrift Fur Kristallographie R.Oldenbourg Verlag GMBH Germany, No. 30, 2009, pp. 341-346.

(Continued)

*Primary Examiner* — Carol M Koslow
(74) *Attorney, Agent, or Firm* — Shimokaji & Associates P.C.

(57) ABSTRACT

A rare earth ion doped lanthanum gallate luminous material containing metal particles and preparation method thereof are provided. The chemical formula of the lanthanum gallate luminous material is $La_{1-x}GaO_3:Ln_x,M_y$, wherein Ln is one or more of $Tm^{3+}$, $Tb^{3+}$, $Eu^{3+}$ and $Sm^{3+}$, M is one of Ag, Au, Pt and Pd, the value range of x is 0.001 to 0.1, and the value range of y is 0.00002 to 0.01. The luminous performance of the lanthanum gallate luminous material can be greatly improved under the same excitation condition and the wavelength of emission light doesn't change, due to the introduction of metal particles into the rare earth ion doped lanthanum gallate luminous material. The lanthanum gallate luminous material has excellent luminous performance, and its emitting photochromic purity and light emitting luminance after excitation are high, so it can be used widely in various kinds of light emitting devices.

10 Claims, 1 Drawing Sheet

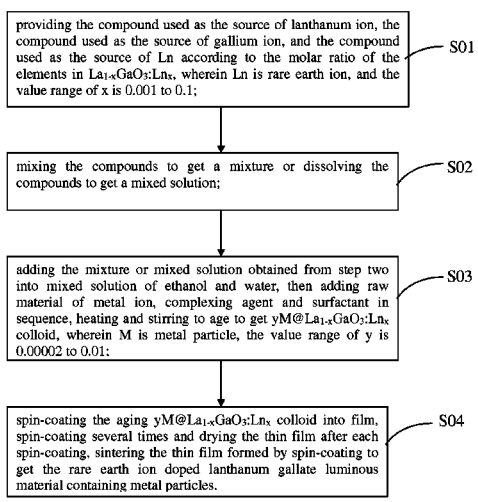

(56) References Cited

OTHER PUBLICATIONS

Liu X et al: "LaGaO3:A (A = Sm<3+> and/or Tb<3+>) as promising phosphors for field emission displays", Journal of Materials Chemistry 2008 Royal Society of Chemistry; Thomas Graham House; Science Park GB, vol. 18, No. 2, 2008, pp. 221-228.

Liu X et al:"Tunable luminescence properties of Tb<3+>-doped LaGaO3 nanocrystalline phosphors", Journal of the Electrochem. Soc.USA. vol. 154, No. Jul. 2007,pp. J185-J189.

Liu Xiaoming et al: "Dy3+- and Eu3+-doped LaGaO3 nanocrystalline phosphors for field emission displays", Journal of Applied Physics, American Institute of Physics. New York, US, vol. 100, No. 12, (Dec. 21, 2006), pp. 124306-1-124306-7.

Kiruthika G V M et al: "Ionic conductivity study on the new high oxide conducting perovskite LaGaO3", Diffusion Mechanisms in Crystalline Materials. Symposium Apr. 13-16, 1998 SanFrancisco, CA, USA,1998, pp. 503-505.

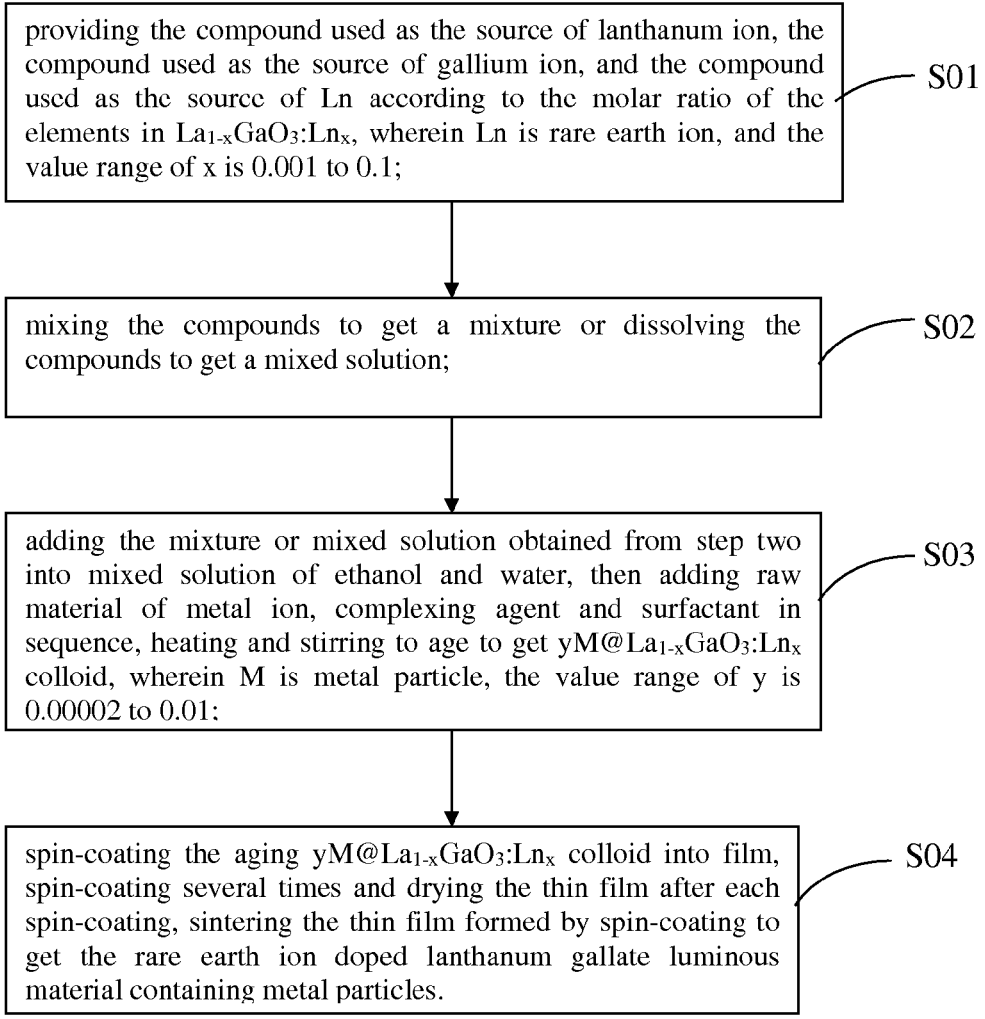

providing the compound used as the source of lanthanum ion, the compound used as the source of gallium ion, and the compound used as the source of Ln according to the molar ratio of the elements in $La_{1-x}GaO_3:Ln_x$, wherein Ln is rare earth ion, and the value range of x is 0.001 to 0.1; — S01 mixing the compounds to get a mixture or dissolving the compounds to get a mixed solution; — S02 adding the mixture or mixed solution obtained from step two into mixed solution of ethanol and water, then adding raw material of metal ion, complexing agent and surfactant in sequence, heating and stirring to age to get $yM@La_{1-x}GaO_3:Ln_x$ colloid, wherein M is metal particle, the value range of y is 0.00002 to 0.01; — S03 spin-coating the aging $yM@La_{1-x}GaO_3:Ln_x$ colloid into film, spin-coating several times and drying the thin film after each spin-coating, sintering the thin film formed by spin-coating to get the rare earth ion doped lanthanum gallate luminous material containing metal particles. — S04

RARE EARTH ION DOPED LANTHANUM GALLATE LUMINOUS MATERIAL CONTAINING METAL PARTICLES AND PREPARATION METHOD THEREOF

FIELD OF THE INVENTION

The present invention relates to luminous material, especially to rare earth ion doped lanthanum gallate luminous material containing metal particles and preparation method thereof.

BACKGROUND OF THE INVENTION

Lighting technology and display technology are getting extensive development and application in people's work and life. Nevertheless, most blue fluorescent materials used for lighting and display devices are zinc sulfide, and oxide and oxysulfide powders activated by rare earth ions. As for sulfide fluorescent powders, the light emitting luminance is higher and it has a certain conductivity while it is apt to decompose under the large electron beam bombardment, and lower the luminous efficiency of fluorescent powders. Oxide fluorescent powders are of good stability, but the luminous efficiency is not high enough under the electron beam bombardment at low voltage. Also, materials are all insulators and the performance is remained to be improved and enhanced. Meanwhile, the flat coating process of fluorescent powders is uneasily controlled, and the adhesion of it to substrate is not satisfying enough, which has a direct impact on its efficiency in the use and life. Rare earth ion doped gallate especially lanthanum gallate ($La_{1-x}GaO_3:Ln_x$) material has good luminous performance of emitting blue light. However, how to make it into thin film, and to endow the prepared luminous thin film with good uniformity, stability and adhesion to substrate, is the main research in the field of materials chemistry and materials physics.

Thus, it is necessary to prepare a lanthanum gallate luminous material which can also be widely implemented in kinds of light emitting devices in order to overcome the disadvantages such as non-uniform of material, low stabilization, poor adhesion to substrate and so on.

SUMMARY OF THE INVENTION

The technical problem of the present invention to be solved is to provide rare earth ion doped lanthanum gallate luminous material containing metal particles which has high luminous efficiency, and preparation method for rare earth ion doped lanthanum gallate luminous material containing metal particles.

The technical solution to solve the technical problem in the present invention is: providing rare earth ion doped lanthanum gallate luminous material containing metal particles, wherein said rare earth ion doped lanthanum gallate luminous material containing metal particles has chemical formula of $yM@La_{1-x}GaO_3:Ln_x$, wherein Ln is rare earth ion, M is metal particle, the value range of x is 0.001 to 0.1, and the value range of y is 0.00002 to 0.01.

In the luminous material of the present invention, said Ln is one or more of $Tm^{3+}$, $Tb^{3+}$, $Eu^{3+}$ and $Sm^{3+}$, said M is one of Ag metal particle, Au metal particle, Pt metal particle and Pd metal particle, the value range of said x is 0.001 to 0.08, the value range of y is 0.00005 to 0.007.

And, the preparation method of rare earth ion doped lanthanum gallate luminous material containing metal particles, comprising:

step one, providing the compound used as the source of lanthanum ion, the compound used as the source of gallium ion, and the compound used as the source of Ln according to the molar ratio of the elements in $La_{1-x}GaO_3:Ln_x$, wherein Ln is rare earth ion, and the value range of x is 0.001 to 0.1;

step two, mixing the compounds to get a mixture or dissolving the compounds to get a mixed solution;

step three, adding the mixture or mixed solution obtained from step two into mixed solution of ethanol and water, then adding raw material of metal ion, complexing agent and surfactant in sequence, heating and stirring to age to get $yM@La_{1-x}GaO_3:Ln_x$ colloid, wherein M is metal particle, the value range of y is 0.00002 to 0.01;

step four, spin-coating the aging $yM@La_{1-x}GaO_3:Ln_x$ colloid into film, spin-coating several times and drying the thin film after each spin-coating, sintering the thin film formed by spin-coating to get the rare earth ion doped lanthanum gallate luminous material containing metal particles.

In the preparation method of the present invention, said compound used as the source of lanthanum ion, said compound used as the source of gallium ion, and said compound used as the source of rare earth ion are at least one of metal oxide, oxalate and carbonate are dissolved in analytically pure hydrochloric acid or nitric acid.

In the preparation method of the present invention, said compound used as the source of lanthanum ion, said compound used as the source of gallate ion, and said compound used as the source of rare earth ion are nitrate or hydrochloride, said Ln is one or more of $Tm^{3+}$, $Tb^{3+}$, $Eu^{3+}$ and $Sm^{3+}$.

In the preparation method of the present invention, said raw material of metal ion is Ag nano colloidal particles, Au nano colloidal particles, Pt nano colloidal particles, Pd nano colloidal particles or $AgNO_3$, $HAuCl_4$, $H_2PtCl_6$, $H_2PdCl_4$, the range of its concentration is 0.001 mol/L to 0.1 mol/L, said volume ratio of water to ethanol is 1:3 to 1:8.

In the preparation method of the present invention, said complexing agent is citric acid, said surfactant is polyethylene glycol, said molar ratio of citric acid to metal particle in raw material is 1:1 to 5:1.

In the preparation method of the present invention, said heating and stirring conditions in said step three is heating in water bath at the temperature in a range of 60° C. to 80° C. and stirring for 2 to 6 hours, and then heating under 70° C. to 150° C. for 20 to 48 hours to volatilize solvent.

In the preparation method of the present invention, in said step four, spin-coating for 3 to 10 times, and then putting the thin film into oven under 100 to 150° C. for 5 to 30 minutes drying after each spin-coating, after that, placing the thin film formed by spin-coating to temperature-programmed oven and sintering till the temperature reach 700° C., and the temperature is kept for 1to 3hours.

In the present invention, the luminous performance of the lanthanum gallate luminous material can be greatly improved under the same excitation condition and the wavelength of emission light doesn't change, due to the introduction of metal particles into the rare earth ion doped lanthanum gallate luminous material. The lanthanum gallate luminous material of the present invention has excellent luminous performance, and its emitting photochromic purity and light emitting luminance after excitation are high, so it can be used widely in various kinds of light emitting devices.

The preparation method of the present invention is of uniform doping, simple process and low-cost. The prepared luminous thin film material with uniform film thickness which has good adhesion to substrate has excellent luminous performance, and its emitting photochromic purity and light emitting luminance are high, so it can be widely implemented in luminous material manufacture.

BRIEF DESCRIPTION OF THE DRAWINGS

Further description of the present invention will be illustrated, which combined with embodiments in the drawings:

FIG. 1 shows the flow chart of the preparation method of rare earth ion doped lanthanum gallate luminous material containing metal particles of the present invention.

DETAILED DESCRIPTION OF ILLUSTRATED EMBODIMENTS

Further description of the present invention will be illustrated, which combined with embodiments in the drawings, in order to make the purpose, the technical solution and the advantages clearer. While the present invention has been described with reference to particular embodiments, it will be understood that the embodiments are illustrative and that the invention scope is not so limited.

According to an embodiment, a rare earth ion doped lanthanum gallate luminous material containing metal particles has chemical formula of $yM@La_{1-x}GaO_3:Ln_x$, wherein Ln is rare earth ion, M is metal particle, the value range of x is 0.001 to 0.1, and the value range of y is 0.00002 to 0.01. In the luminous material of the present invention, Ln is one or more of $Tm^{3+}$, $Tb^{3+}$, $Eu^{3+}$ and $Sm^{3+}$, said M is one of Ag metal particle, Au metal particle, Pt metal particle and Pd metal particle. The value range of x is 0.001 to 0.08, and the value range of y is 0.00005 to 0.007.

Referring to FIG. 1, FIG. 1 shows process of the preparation method of rare earth ion doped lanthanum gallate luminous material containing metal particles; the preparation method includes the following steps:

S01: providing the compound used as the source of lanthanum ion, the compound used as the source of gallium ion, and the compound used as the source of Ln according to the molar ratio of the elements in $La_{1-x}GaO_3:Ln_x$, wherein Ln is rare earth ion, and the value range of x is 0.001 to 0.1;

S02: mixing the compounds to get a mixture or dissolving the compounds to get a mixed solution;

S03: adding the mixture or mixed solution as pre-treatment into mixed solution of ethanol and water, then adding raw material of metal ion, complexing agent and surfactant in sequence, heating and stirring to age to get $yM@La_{1-x}GaO_3:Ln_x$ colloid, wherein M is metal particle, the value range of y is 0.00002 to 0.01;

S04: spin-coating the aging $yM@La_{1-x}GaO_3:Ln_x$ colloid into film, spin-coating several times and drying the thin film after each spin-coating, sintering the thin film formed by spin-coating to get the rare earth ion doped lanthanum gallate luminous material containing metal particles.

In step S01 said compound used as the source of lanthanum ion, gallium ion, and rare earth ion are at least one of metal oxide, oxalate and carbonate, said Ln is one or more of $Tm^{3+}$, $Tb^{3+}$, $Eu^{3+}$ and $Sm^{3+}$. The raw material of metal oxide can be $La_2O_3$, $Ga_2O_3$, $Tm_2O_3$, $Eu_2O_3$, $Sm_2O_3$, $Tb_4O_7$. The raw material of hydrochloride can be $LaCl_3$, $GaCl_3$, $TmCl_3$, $TbCl_3$, $EuCl_3$, $SmCl_3$. The raw material of nitrate can be $La(NO_3)_3$, $Ga(NO_3)_3$, $Tm(NO_3)_3$, $Tb(NO_3)_3$, $Eu(NO_3)_3$, $Sm(NO_3)_3$. The raw material of carbonate can be $La^{3+}$, $Ga^{3+}$, $Tm^{3+}$, $Eu^{3+}$, $Tb^{3+}$ or $Sm^{3+}$ carbonate. The raw material of oxalate can be $La^{3+}$, $Ga^{3+}$, $Tm^{3+}$, $Eu^{3+}$, $Tb^{3+}$ or $Sm^{3+}$ oxalate.

In step S02, providing said compound used as the source of lanthanum ion, said compound used as the source of gallium ion, and said compound used as the source of rare earth ion are metal oxide, oxalate and carbonate, analytically pure hydrochloric acid or nitric acid ($HNO_3$:65% to 68%, at the concentration of 14.4 to 15.2 mol/L; HCl:36 to 37%, at the concentration of 11.7 mol/L) is used to dissolve metal oxide, oxalate and carbonate. In step S02, the compounds used as the source are dissolved under the heating condition of 15° C. to 100° C.

In step S03, the raw material of metal particle is Ag nano colloidal particles, Au nano colloidal particles, Pt nano colloidal particles, Pd nano colloidal particles or $AgNO_3$, $HAuCl_4$, $H_2PtCl_6$, $H_2PdCl_4$ salt which is soluble both in water and ethanol, the range of the concentration is 0.001 mol/L to 0.1mol/L. As solvents, water and ethanol is deionized water or anhydrous ethanol, the volume ratio is 1:3 to 1:8. The complexing agent is superior grade pure citric acid, wherein the molar ratio of said citric acid to metal particles in raw material is 1:1 to 5:1. The surfactant is analytically pure polyethylene glycol with molecular weight of 6000, 8000, 10000 or 20000, wherein the concentration of added polyethylene glycol is 0.05 to 0.20g/mL. The heating and stirring conditions is heating in water bath at the temperature in a range of 60° C. to 80°C. and stiffing for 2 to 6 hours, and then heating under 70° C. to 150° C. for 20 to 48hours to get $yM@La_{1-x}GaO_3:Ln_x$ colloid by volatilizing solvent.

In step S04, spin-coating for 3 to 10 times, and then putting the thin film into oven under 100 ° C. to 150° C. for 5 to 30 minutes drying after each spin-coating, after that, placing the thin film formed by spin-coating till the temperature reach 700° C. to 1200° C. and the temperature is kept for 1 to 3 hours. At last, the lanthanum gallate luminous thin film material with a film thickness of 100 nm to 2 μm is obtained.

In the present invention, the luminous performance of the lanthanum gallate luminous material can be greatly improved under the same excitation condition and the wavelength of emission light doesn't change, due to the introduction of metal particles into the rare earth ion doped lanthanum gallate luminous material. The lanthanum gallate luminous material of the present invention has excellent luminous performance, and its emitting photochromic purity and light emitting luminance after excitation are high, so it can be used widely in various kinds of light emitting devices.

The preparation method of the present invention is of uniform doping, simple process and low-cost. The prepared luminous thin film material with uniform film thickness which has good adhesion to substrate has excellent luminous performance, and its emitting photochromic purity and light emitting luminance are high, so it can be widely implemented in luminous material manufacture.

Special examples are disclosed as follows to demonstrate the rare earth ion doped lanthanum gallate luminous material containing metal particles and preparation method for making the same.

Example 1

Accurately weighting and placing 6.4286 g of $La(NO_3)_3 \cdot 6H_2O$ and 6.4556 g of $Ga(NO_3)_3 \cdot XH_2O$ containing 16.2% Ga element into vessel under room temperature, then adding 50 mL solution of ethanol and water at the volume ratio of 3:1. Under the condition of heating in water bath at 60° C. and stirring, adding 1.5 mL of 0.1 mol/L $Tm^{3+}$ solution, 0.15 mL of 0.01 mol/L $AgNO_3$ solution, 11.5284 g of citric acid and 5 g of polyethylene glycol which is 10000, and then stirring for 4 hours to get the homogeneous transparent precursor solution.

Placing the prepared $La_{0.99}GaO_3:Tm_{0.01}, Ag_{0.0001}$ solution into oven at 70° C. for 48-hour aging to get $La_{0.99}GaO_3:Tm_{0.01}, Ag_{0.0001}$ gel and spin-coating for 6 times. Putting the thin film into oven under 120° C. for 15 minutes drying after each spin-coating, after that, placing the thin film formed by spin-coating to temperature-programmed oven and sintering to 1000° C. at a speed of 3° C., and the temperature is kept for 3 hours. At last, the $La_{0.99}GaO_3:Tm_{0.01}$, $Ag_{0.0001}$ luminous thin film material with film thickness of 1 μm is obtained, which can emit blue light under the excitation of the electron beam.

Example 2

Accurately weighting and wetting 0.8064 g of $La_2O_3$ and 0.4686 g of $Ga_2O_3$ under room temperature, dissolving them in vessel under stirring at 15° C. with 4.1 mL of hydrochloric acid and 1 mL deionized water. Cooling and adding 50 mL solution of ethanol and water at the volume ratio of 3:1. Under the condition of heating in water bath at 60° C. and stirring, adding 0.5 mL of 0.1 mol/L $Tm^{3+}$ solution, 2.5 mL of 0.001 mol/L solution of Ag nano colloidal particles, 4.8035 g of citric acid and 5 g of polyethylene glycol which is 6000, and then stirring for 4 hours to get the homogeneous transparent precursor solution.

Placing the prepared $La_{0.99}GaO_3:Tm_{0.01}$, $Ag_{0.0005}$ solution into oven at 150° C. for 20-hour aging to get $La_{0.99}GaO_3$: $Tm_{0.01}$, $Ag_{0.0005}$ gel and spin-coating for 6 times, putting the thin film into oven under 100° C. for 30 minutes drying after each spin-coating. Placing the thin film formed by spin-coating to temperature-programmed oven and sintering to 1200° C. at a speed of 5° C., and the temperature is kept for 2 hours. At last, the $La_{0.99}GaO_3:Tm_{0.01}$, $Ag_{0.0001}$ luminous thin film material with film thickness of 1 μm is obtained, which can emit blue light under the excitation of the electron beam.

Example 3

Accurately weighting and placing 2.1537 g $La(NO_3)_3 \cdot 6H_2O$ and 2.1519 g Ga $(NO_3)_3 \cdot XH_2O$ containing 16.2% Ga element into vessel under room temperature, then adding 50 mL solution of ethanol and water at the volume ratio of 8:1. Under the condition of heating in water bath at 70° C. and stirring, adding 0.25 mL of 0.1mol/L $Tb^{3+}$ solution, 0.25 mL of 0.001 mol/L solution of Ag nano colloidal particles, 0.9607 g of citric acid and 5 g of polyethylene glycol which is 8000, and then stirring for 4 hours to get the homogeneous transparent precursor solution.

Placing the prepared $La_{0.995}GaO_3:Tm_{0.005}$, $Ag_{0.00005}$ solution into oven at 70° C. for 48-hour aging to get $La_{0.995}GaO_3$: $Tm_{0.005}$, $Ag_{0.00005}$ gel and spin-coating for 3 times, putting the thin film into oven under 150° C. for 5 minutes drying after each spin-coating. Placing the thin film formed by spin-coating to temperature-programmed oven and sintering to 700° C. at a speed of 1° C., and the temperature is kept for 3 hours. At last, the $La_{0.995}GaO_3:Tb_{0.005}$ luminous thin film material with film thickness of 100 nm is obtained, which can emit blue-white light under the excitation of the electron beam.

Example 4

Accurately weighting and wetting 2.3213 g of $La_2O_3$ and 1.4058 g of $Ga_2O_3$ under room temperature, dissolving them in vessel under stirring at 100° C. with 3.1 mL of concentrated nitric acid and 3 mL deionized water. Cooling and adding 50 mL solution of ethanol and water at the volume ratio of 3:1. Under the condition of heating in water bath at 65° C. and stirring, adding 0.75 mL of 1 mol/L $Tb^{3+}$ solution, 1.05 mL of 0.1 mol/L $H_2PdCl_4$ solution, 5.7642 g of citric acid and 10 g of polyethylene glycol which is 10000, and then stirring for 4 hours to get the homogeneous transparent precursor solution.

Placing the prepared $La_{0.95}GaO_3:Tb_{0.05}$, $Pd_{0.007}$ solution into oven at 60° C. for 40-hour aging to get $La_{0.95}GaO_3$: $Tb_{0.05}$, $Pd_{0.007}$ gel and spin-coating for 10 times, putting the thin film into oven under 120° C. for 15 minutes drying after each spin-coating. After that, placing the thin film formed by spin-coating to temperature-programmed oven and sintering to 1200° C. at a speed of 4° C., and the temperature is kept for 1 hour. At last, the $La_{0.95}GaO_3:Tb_{0.05}$, $Pd_{0.007}$ luminous thin film material with film thickness of 2 μm is obtained, which can emit green light under the excitation of the electron beam.

Example 5

Accurately weighting and placing 7.9481 g of $LaCl_3 \cdot 6H_2O$ and 4.4081 g of $GaCl_3$ into vessel under room temperature, then adding 50 mL solution of ethanol and water at the volume ratio of 4:1. Under the condition of heating in water bath at 60° C. and stirring, adding 2.5 mL of 1 mol/L $Tb^{3+}$ solution, 2.5 mL of 0.1 mol/L $HAuCl_4$ solution, 5.7642 g of citric acid and 2.5 g of polyethylene glycol which is 10000, and then stirring for 6 hours to get the homogeneous transparent precursor solution. Placing the prepared $La_{0.90}GaO_3:Tb_{0.10}$, $Au_{0.01}$ solution into oven at 70° C. for 40-hour aging to get $La_{0.90}GaO_3:Tb_{0.10}$, $Au_{0.01}$ gel and spin-coating for 6 times, putting the thin film into oven under 100° C. for 20 minutes drying after each spin-coating.

Placing the thin film formed by spin-coating to temperature-programmed oven and sintering to 1000° C. at a speed of 3° C., and the temperature is kept for 2 hours. At last, the $La_{0.90}GaO_3:Tb_{0.10}$, $Au_{0.01}$ luminous thin film material with film thickness of 1 μm is obtained, which can emit green light under the excitation of the electron beam.

Example 6

Accurately weighting and placing 6.4610 g of $La(NO_3)_3 \cdot 6H_2O$ and 6.4556 g of Ga $(NO_3)_3 \cdot XH_2O$ containing 16.2% Ga element into vessel under room temperature, then adding 50 mL solution of ethanol and water at the volume ratio of 4:1. Under the condition of heating in water bath at 70° C. and stirring, adding 0.75 mL of 0.1 mol/L $Sm^{3+}$ solution, 7.5 mL of 0.001 mol/L solution of Pt nano colloidal particles, 5.7642 g of citric acid and 5 g of polyethylene glycol which is 20000, and then stirring for 3 hours to get the homogeneous transparent precursor solution. Placing the prepared $La_{0.995}GaO_3$: $Sm_{0.005}$, $Pt_{0.0005}$ solution into oven at 70° C. for 42-hour aging to get $La_{0.995}GaO_3:Sm_{0.005}$, $Pt_{0.0005}$ gel and spin-coating for 10 times, putting the thin film into oven under 120° C. for 15 minutes drying after each spin-coating.

Placing the thin film formed by spin-coating to temperature-programmed oven and sintering to 1000° C. at a speed of 5° C., and the temperature is kept for 2 hours. At last, the $La_{0.995}GaO_3:Sm_{0.005}$, $Pt_{0.0005}$ luminous thin film material with film thickness of 2 μm is obtained, which can emit orange red light under the excitation of the electron beam.

Example 7

Accurately weighting and wetting 0.8137 g of $La_2O_3$ and 0.4686 g of $Ga_2O_3$ under room temperature, dissolving them in vessel under stirring at 50° C. with 1.1 mL of concentrated nitric acid and 1 mL deionized water. Cooling and adding 50 mL solution of ethanol and water at the volume ratio of 3:1. Under the condition of heating in water bath at 70° C. and stirring, adding 0.5 mL of 0.01 mol/L $Sm^{3+}$ solution, 0.1 mL of 0.001 mol/L solution of Au nano colloidal particles, 5.7642 g of citric acid and 5 g of polyethylene glycol which is 8000, and then stirring for 4 hours to get the homogeneous transparent precursor solution. Placing the prepared $La_{0.999}GaO_3$:$Sm_{0.001}$, $Au_{0.00002}$ solution into oven at 60° C. for 48-hour aging to get $La_{0.999}GaO_3$:$Sm_{0.001}$, $Au_{0.00002}$ gel and spin-coating for 4 times, putting the thin film into oven under 120° C. for 15 minutes drying after each spin-coating.

Placing the thin film formed by spin-coating to temperature-programmed oven and sintering to 1000° C. at a speed of 4° C., and the temperature is kept for 3 hours. At last, the $La_{0.999}GaO_3$:$Sm_{0.001}$, $Au_{0.00002}$ luminous thin film material with film thickness of 800 nm is obtained, which can emit orange red light under the excitation of the electron beam.

Example 8

Accurately weighting and placing 8.1270 g of $LaCl_3 \cdot 6H_2O$ and 4.4018 g of $GaCl_3$ into vessel under room temperature, then adding 50 mL solution of ethanol and water at the volume ratio of 4:1. Under the condition of heating in water bath at 70° C. and stirring, adding 2 mL of 1 mol/L $Eu^{3+}$ solution, 1.25 mL of 0.1 mol/L $H_2PtCl_6$ solution, 5.7642 g of citric acid and 5 g of polyethylene glycol which is 10000, and then stirring for 4 hours to get the homogeneous transparent precursor solution. Placing the prepared $La_{0.92}GaO_3$:$Eu_{0.08}$, $Pt_{0.005}$ solution into oven at 70° C. for 48-hour aging to get $La_{0.92}GaO_3$:$Eu_{0.08}$, $Pt_{0.005}$ gel and spin-coating for 8 times, putting the thin film into oven under 120° C. for 20 minutes drying after each spin-coating.

Placing the thin film formed by spin-coating to temperature-programmed oven and sintering to 1000° C. at a speed of 5° C., and the temperature is kept for 2 hours. At last, the $La_{0.92}GaO_3$:$Eu_{0.08}$, $Pt_{0.005}$ luminous thin film material with film thickness of 1.5 μm is obtained, which can emit red light under the excitation of the electron beam.

Example 9

Accurately weighting and placing 5.8456 g of $La(NO_3)_3 \cdot 6H_2O$ and 6.4556 g of $Ga(NO_3)_3 \cdot XH_2O$ containing 16.2% Ga element into vessel under room temperature, then adding 50 mL solution of ethanol and water at the volume ratio of 4:1. Under the condition of heating in water bath at 80° C. and stirring, adding 0.75 mL of 1 mol/L $Tb^{3+}$ solution, 0.75 mL of 1 mol/L $Eu^{3+}$ solution, 1.05 mL of 0.1 mol/L $AgNO_3$ solution, 5.7642 g of citric acid and 5 g of polyethylene glycol which is 20000, and then stirring for 2 hours to get the homogeneous transparent precursor solution. Placing the prepared $La_{0.9}GaO_3$:$Tb_{0.05}$, $Eu_{0.05}$, $Ag_{0.007}$ solution into oven at 60° C. for 36-hour aging to get $La_{0.9}GaO_3$:$Tb_{0.05}$, $Eu_{0.05}$, $Ag_{0.007}$ gel and spin-coating for 6 times, putting the thin film into oven under 120° C. for 15 minutes drying after each spin-coating.

Placing the thin film formed by spin-coating to temperature-programmed oven and sintering to 1000° C. at a speed of 3° C., and the temperature is kept for 3 hours. At last, the $La_{0.9}GaO_3$:$Tb_{0.05}$,$Eu_{0.05}$,$Ag_{0.007}$ luminous thin film material with film thickness of 1 μm is obtained, which can emit white light under the excitation of the electron beam.

Example 10

Accurately weighting and wetting 1.5964 g of $La_2O_3$ and 0.9372 g of $Ga_2O_3$ under room temperature, dissolving them in vessel under stirring at 80° C. with 2 mL of concentrated nitric acid and 2 mL deionized water. Cooling and adding 50 mL solution of ethanol and water at the volume ratio of 3:1. Under the condition of heating in water bath at 60° C. and stirring, adding 1 mL of 0.1 mol/L $Tb^{3+}$ solution, 1 mL of 0.1 mol/L solution of $Sm^{3+}$ solution, 1 mL of 0.01 mol/L $HAuCl_4$ solution, 5.7642 g of citric acid and 5 g of polyethylene glycol which is 10000, and then stirring for 6 hours to get the homogeneous transparent precursor solution. Placing the prepared $La_{0.98}GaO_3$:$Tb_{0.01}$,$Sm_{0.01}$, $Au_{0.001}$ solution into oven at 70° C. for 48-hour aging to get $La_{0.98}GaO_3$:$Tb_{0.01}$,$Sm_{0.01}$, $Au_{0.001}$ gel and spin-coating for 8 times, putting the thin film into oven under 120° C. for 15 minutes drying after each spin-coating.

Placing the thin film formed by spin-coating to temperature-programmed oven and sintering to 1200° C. at a speed of 3° C., and the temperature is kept for 1 hour. At last, the $La_{0.98}GaO_3$:$Tb_{0.01}$,$Sm_{0.01}$, $Au_{0.001}$ luminous thin film material with film thickness of 1.5 μm is obtained, which can emit white light under the excitation of the electron beam.

Example 11

Accurately weighting 2.3213 g of $La_2O_3$ and 1.4058 g of $Ga_2O_3$ under room temperature, dissolving them in vessel under stirring at 15° C. with 3.1 mL of concentrated nitric acid and 3 mL deionized water. Cooling and adding 50 mL solution of ethanol and water at the volume ratio of 3:1. Under the condition of heating in water bath at 65° C. and stirring, adding 0.675 mL of 1 mol/L $Tb^{3+}$ solution, 0.75 mL of 0.1 mol/L solution of $Sm^{3+}$ solution, 1.05 mL of 0.01 mol/L solution of Pd nano colloidal particles, 5.7642 g of citric acid and 10 g of polyethylene glycol which is 10000, and then stirring for 4 hours to get the homogeneous transparent precursor solution. Placing the prepared $La_{0.95}GaO_3$:$Tb_{0.045}$, $Sm_{0.005}$,$Pd_{0.0007}$ solution into oven at 70° C. for 40-hour aging to get $La_{0.95}GaO_3$:$Tb_{0.045}$,$Sm_{0.005}$,$Pd_{0.0007}$ gel and spin-coating for 4 times, putting the thin film into oven under 120° C. for 15 minutes drying after each spin-coating.

Placing the thin film formed by spin-coating to temperature-programmed oven and sintering to 1000° C. at a speed of 5° C., and the temperature is kept for 1 hour. At last, the $La_{0.95}GaO_3$:$Tb_{0.045}$,$Sm_{0.005}$,$Pd_{0.0007}$ luminous thin film material with film thickness of 800 nm is obtained, which can emit white light under the excitation of the electron beam.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A rare earth ion doped lanthanum gallate luminous material containing metal particles, wherein the chemical formula of said rare earth ion doped lanthanum gallate luminous material containing metal particles is $yM@La_{1-x}GaO_3$:$Ln_x$, wherein Ln is rare earth ion, M is metal particle, the value range of x is 0.001 to 0.1, and the value range of y is 0.00002 to 0.01.

2. The rare earth ion doped lanthanum gallate luminous material according to claim 1, wherein said Ln is one or more of $Tm^{3+}$, $Tb^{3+}$, $Eu^{3+}$ and $Sm^{3+}$, said M is one of Ag metal particle, Au metal particle, Pt metal particle and Pd metal particle.

3. The rare earth ion doped lanthanum gallate luminous material according to claim 1, wherein the value range of x is 0.001 to 0.08, and the value range of y is 0.00005 to 0.007.

4. A preparation method of a rare earth ion doped lanthanum gallate luminous material containing metal particles, comprising:

step one, providing the compound used as the source of lanthanum ion, the compound used as the source of gallium ion, and the compound used as the source of Ln according to the molar ratio of the elements in chemical formula $La_{1-x}GaO_3:Ln_x$, wherein Ln is rare earth ion, and the value range of x is 0.001 to 0.1;

step two, mixing the compounds to get a mixture or dissolving the compounds to get a mixed solution;

step three, adding the mixture or mixed solution obtained from step two into mixed solution of ethanol and water, then adding raw material of metal ion, complexing agent and surfactant in sequence, heating and stirring to age to get $yM@La_{1-x}GaO_3:Ln_x$, wherein M is metal particle, the value range of y is 0.00002 to 0.01;

step four, spin coating the aging $yM@La_{1-x}GaO_3:Ln_x$ colloid into film, spin-coating several times and drying the thin film after each spin-coating sintering the thin film formed by spin-coating to get the rare earth ion doped lanthanum gallate luminous material containing metal particles.

5. The preparation method according to claim 4, wherein said compound used as the source of lanthanum ion, said compound used as the source of gallium ion, and said compound used as the source of rare earth ion are at least one of metal oxide, oxalate and carbonate, and dissolved in analytically pure hydrochloric acid or nitric acid.

6. The preparation method according to claim 4, wherein said compound used as the source of lanthanum ion, said compound used as the source of gallium ion, and said compound used as the source of rare earth ion are nitrate or hydrochloride, Ln is one or more of $Tm^{3+}$, $Tb^{3+}$, $Eu^{3+}$ and $Sm^{3+}$.

7. The preparation method according to claim 4, wherein said raw material of metal ion is Ag nano colloidal particles, Au nano colloidal particles, Pt nano colloidal particles, Pd nano colloidal particles, or $AgNO_3$, $HAuCl_4$, $H_2PtCl_6$, $H_2PdCl_4$, the range of its concentration is 0.001 mol/L to 0.1 mol/L, said volume ratio of water to ethanol is 1:3 to 1:8.

8. The preparation method according to claim 4, wherein said complexing agent is citric acid, said surfactant is polyethylene glycol, said molar ratio of citric acid to metal particle in raw material is 1:1 to 5:1.

9. The preparation method according to claim 4, wherein said heating and stirring conditions in said step three is heating in water bath at the temperature in a range of 60° C. to 80° C. and stirring for 2 to 6 hours, and then heating under 70° C. to 150° C. for 20 to 48 hours to volatilize solvent.

10. The preparation method according to claim 4, wherein, in said step four, spin-coating for 3 to 10 times, and then putting the thin film into oven under 100° C. to 150° C. for 5 to 30 minutes drying after each spin-coating, after that, placing the thin film formed by spin-coating to temperature-programmed oven and sintering till the temperature reach 700° C. to 1200° C., and the temperature is kept for 1 to 3 hours.

* * * * *